United States Patent

[11] 3,604,340

[72] Inventor Stanley J. Simmons
 408 Latone, Monrovia, Calif. 91016
[21] Appl. No. 687,881
[22] Filed Dec. 4, 1967
[45] Patented Sept. 14, 1971

[54] PRECOOKING APPARATUS
 5 Claims, 7 Drawing Figs.
[52] U.S. Cl. .................................................. 99/404
[51] Int. Cl. ..................................................... A47j 37/00
[50] Field of Search ........................................... 99/107, 404, 407, 408, 443

[56] References Cited
 UNITED STATES PATENTS
1,234,131 7/1917 Cleveland ..................... 99/404
3,203,341 8/1965 Hedgepeth ................... 99/404 X
 OTHER REFERENCES
 Also considered, 3,460,462 99– 404, 2,807,203 99– 404, 2,616,359 99– 408, 1,236,405 99– 404, 3,152,537 99– 404, 3,446,138 99– 404, 1,209,811 Fr. 99– 404.

*Primary Examiner*—Walter A. Scheel
*Assistant Examiner*—Leon G. Machlin
*Attorney*—Christie, Parker and Hale ABSTRACT: An apparatus for precooking chicken or other food products which are to be reheated by frying prior to consumption. The product is provided with a coating or breading, and is placed in a perforated tray to be conveyed through a tank holding a shallow bath of heated cooking oil. The depth of the bath is controlled so only the lowermost portion of the product makes direct contact with oil, and so the tray or pan has no tendency to float in the bath while being conveyed through the tank. Alternatively, the perforated tray is placed in a solid pan which carries a very shallow layer of cooking oil, and the solid pan is conveyed through the tank. The product is tenderized and the coating is converted to a protective shield by the hot, humid air above the oil and surrounding the product as it is conveyed through the bath. The precooked product and tray are removed from the bath and permitted to drain and cool prior to packaging.

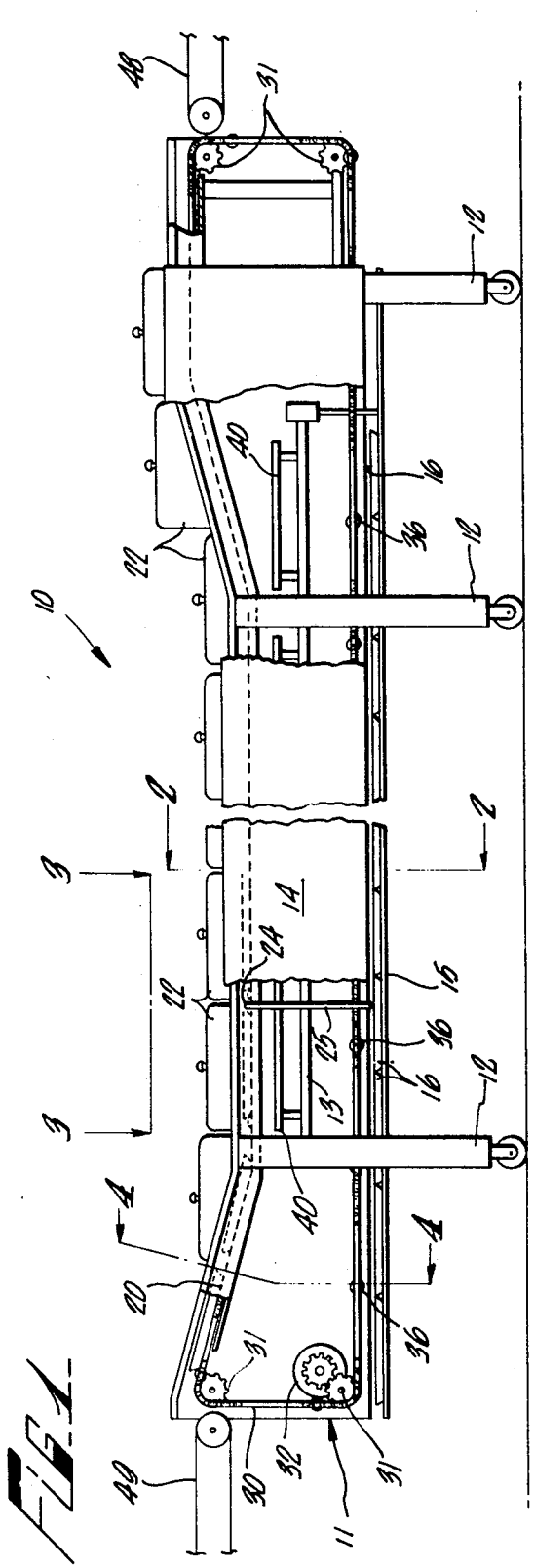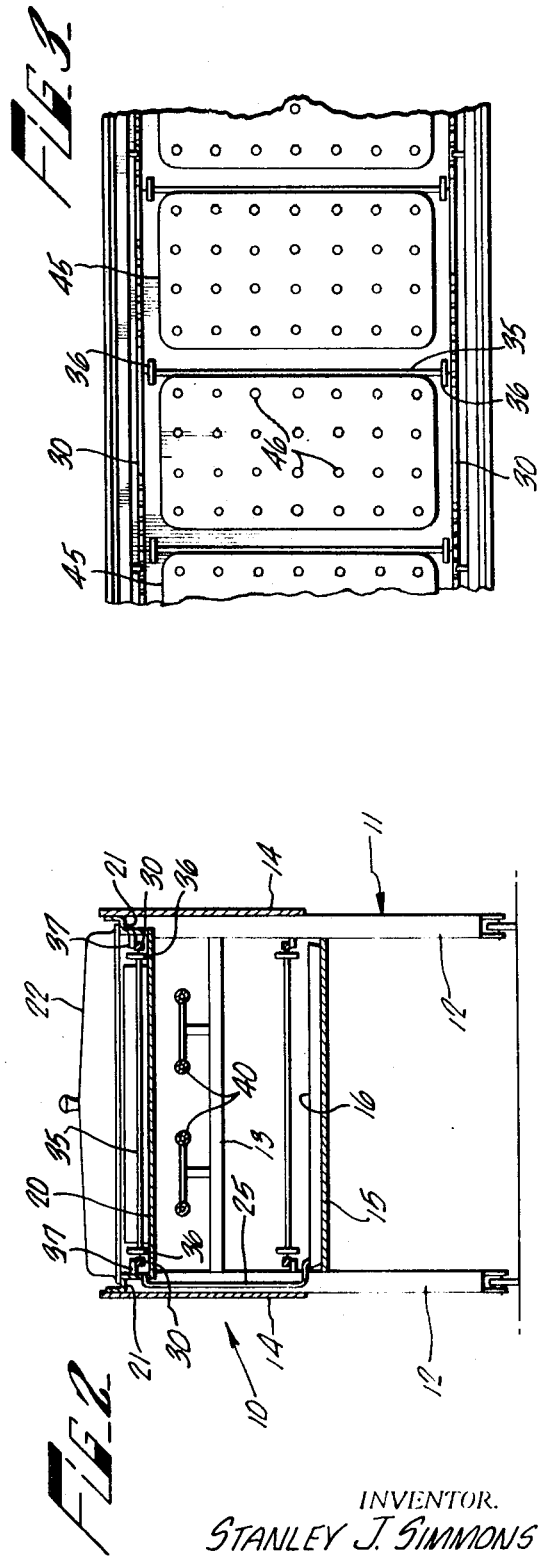

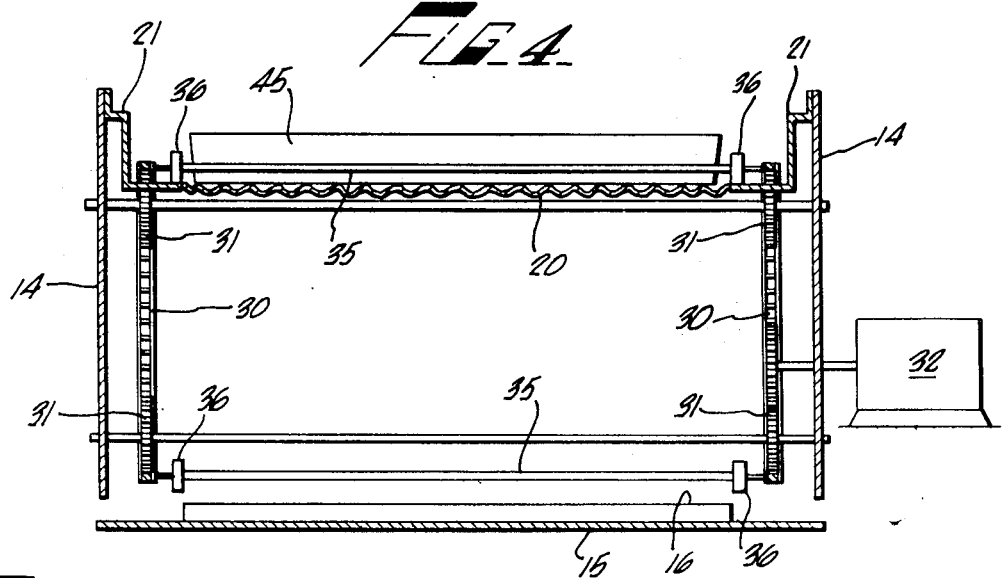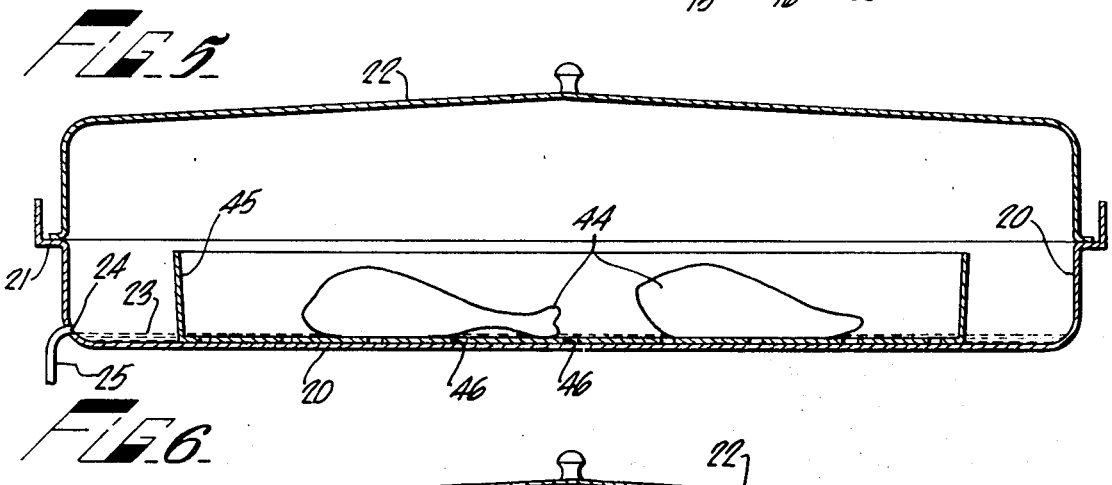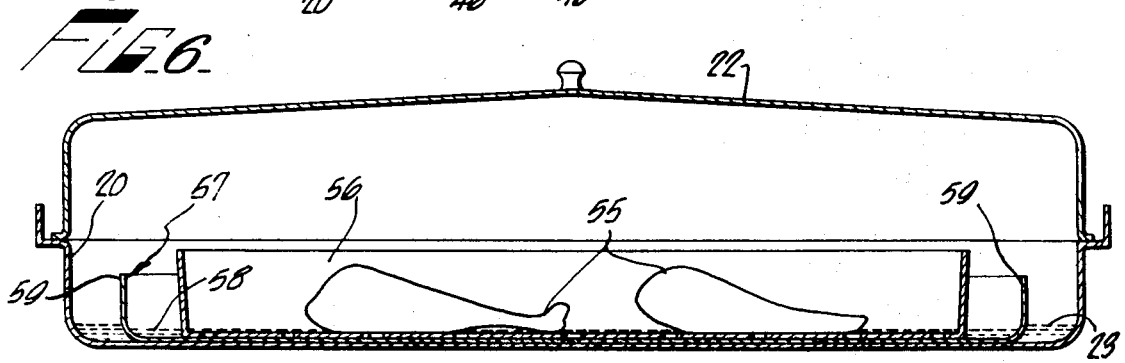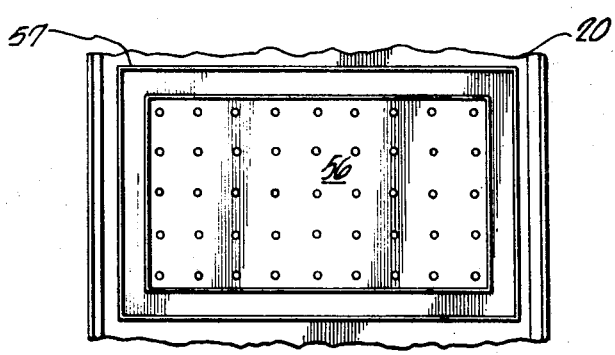

PRECOOKING APPARATUS

BACKGROUND OF THE INVENTION

The food industry has in recent years developed various precooked products which are made ready for consumption by a relatively quick reheating and perhaps final cooking. These products are especially attractive to restaurants as prolonged preparation is avoided, and the food can be made ready for prompt service. The precooked products are typically capable of relatively long term storage in frozen form.

Some precooked foods such as chicken have a coating or breading applied to the outer surfaces thereof. The coating helps to prevent loss of natural juices in the food during cooking, and is also sometimes used to impart flavor or color to the cooked product. Flour is a desirable coating for chicken, but other materials can also be used such as batters made of eggs, milk, and flour, or similar mixtures to which bread or cereal crumbs can be added.

Precooking in the past has usually been in deep-fat fryers, but boiling, stewing and pressure-cooking techniques have also been used. Conventional pan frying is too slow and cumbersome if reasonable production rates and costs are to be achieved. Boiling, stewing and pressure cooking are not especially satisfactory for coated products such as chicken because the coating must be applied after completion of the precooking process. Natural juices and flavor are lost from the food during precooking, and an adhesive or bonding agent such as milk solids, eggs, or the like must be used to insure adherence of the coating to the product. These factors, plus the shrinkage and extra labor required for coating application, have made the deep-fat fryer the most popular precooking method for coated products.

Precooking of coated products by deep-fat frying has several important deficiencies. First, a relatively heavy breading-type coating must be used to prevent erosion and dissipation of the coating when the product is submerged in boiling oil or fat. This type of coating leads to a second problem which is excessive absorption of cooking oil or fat in the coated product. When the precooked food is substantially reheated or finish cooked, there is an undesirable taste which arises from the excessive retention of cooking oil from the precooking process. Precooking by deep-fat frying has thus been less than satisfactory due to the loss of a wholesome, fresh taste and, particularly in the case of chicken, a deterioration of the delicate flavor normally associated with a freshly prepared product.

The apparatus of this invention overcome the deficiencies of precooking by deep-fat frying, and permit precooking of coated products such as chickens at high production rates and low processing cost. The product is prepared with a simple coating such as plain flour, and is then placed in a metal tray having a perforated floor. The tray is then placed in a conveyor-type oven where it is drawn through a shallow bath of heated cooking oil. The depth of the bath is controlled such that only the lowermost portions of the chicken in the tray are in direct contact with the cooking oil.

The tray is slowly conveyed through a covered zone in the oven, and precooking is accomplished by heat transferred from the hot bottom of the tank, and from a hot, humid atmosphere which surrounds the chicken. When precooking is complete, the chicken and tray are removed from the oven and allowed to cool. The chicken can thereafter be left in the perforated tray, and subsequently processed by the usual steps of quick chilling, wrapping, and deep freezing to be ready for marketing.

Precooking can also be accomplished by placing the chicken or similar coated product on a perforated sheet or tray which is in turn placed in a solid open-topped pan which carries a layer of cooking oil about one-sixteenth to one-eighth inch in depth. The solid pan is in turn conveyed through the shallow bath of heated oil in the tank. This approach has the advantage that juices dripping from the product during precooking are trapped in the solid pan, and the resulting mixture of oil and juices provides an excellent base for subsequent preparation of a natural gravy. Furthermore, the useful life of oil in the tank is appreciably extended as this oil is not mixed with juices from the product.

The precooked product has a thin coating which has not been submerged in cooking oil, and excessive absorption of oil and consequent deterioration of taste is therefore avoided. When the product is finish cooked by quickly frying just prior to serving, it will have a tenderness, color and flavor which closely resembles that of freshly prepared food.

SUMMARY OF THE INVENTION

Briefly stated, the apparatus of this invention is a conveyor-type cooker for precooking a food product such as chicken. The cooker comprises an elongated frame with a tank secured thereto and adapted to contain a shallow bath of cooking oil. The tank includes means for limiting the depth of the cooking-oil bath to less than about 1/4 inch. A food-product tray is disposed in and rests on the tank. The tray has a perforated bottom whereby the lowermost portion of the food product is in contact with the cooking oil. Conveying means are provided for moving the tray through the tank, and heating means maintain the cooking oil at an elevated temperature. Preferably, the cooker is provided with a plurality of domed covers adapted to be positioned along and over the cooking-oil tank whereby the tank is substantially covered except at its entrance and exit ends where openings adequate to provide clearance for the tray and product are provided.

BRIEF DESCRIPTION OF THE DRAWINGS

The invention will be described in detail with reference to the attached drawings, in which:

FIG. 1 is a side elevation of a conveyor cooker according to the invention;

FIG. 2 is a view along line 2—2 of FIG. 1;

FIG. 3 is a view along line 3—3 of FIG. 1;

FIG. 4 is a view along line 4—4 of FIG. 1;

FIG. 5 is a sectional side view of a perforated tray carrying a piece of chicken to be precooked;

FIG. 6 is a sectional side view of a perforated tray carried in a solid pan which is conveyed through the cooker; and FIG. 7 is a top view of the tray and pan shown in FIG. 6.

DETAILED DESCRIPTION OF THE PREFERRED EMBODIMENT

Referring to the drawings, a conveyor oven 10 according to the invention includes an elongated upright frame 11 having conventional legs 12 and supporting cross members 13. The lower part of the oven is partially enclosed by a pair of sidewalls 14 and a bottom wall 15. The sidewalls have lower edges which are positioned slightly above the bottom wall to provide access to a plurality of drip pans 16 resting on the bottom wall.

A shallow, elongated tank 20 for cooking oil is secured at the upper end of the frame. Each side of the tank has an outwardly turned lip 21, and a plurality of domed covers 22 rest on these lips. The ends of the tank are upwardly sloped as best seen in FIG. 1, and the bottom of the tank in the sloping portions is corrugated (FIG. 4) to permit rapid drainage of oil from trays emerging from the oven. A shallow bath of cooking oil 23 is disposed in the bottom of tank 20, and preferably has a depth of about one-eighth inch. The maximum depth of the cooking-oil bath is limited to no more than about one-quarter inch by any convenient means such as overflow outlet holes 24 extending through the sides of the tank and positioned about one-fourth inch above the floor of the tank. Lengths of tubing 25 are secured to the sides of the tank in communication with the outlet holes, and these tubes direct any overflow cooking oil from the tank to drip pans 16. A conventional drip feeder (not shown) can be used with the oven to supply fresh oil to the tank.

A conveyor system moves through tank 20, and includes a pair of laterally spaced roller chains 30 which pass over and are engaged by a series of cogwheels 31 secured to the frame. A conventional variable-speed drive motor 32 is coupled to the chains through the cogwheels, and the motor continuously drives the chains through the tank. As best seen in FIG. 1, the chains emerge from the tank and follow a return path under the tank just above the drip pans.

A plurality of longitudinally spaced bars 35 are secured to and extend between carrier chains 30, and a pair of wheels 36 are mounted on opposite ends of each bar 35. The wheels ride on the floor of tank 20, and prevent the chains from dragging in the shallow layer of cooking oil. A plurality of rollers 37 extend from opposite sides of the tank to maintain tension in the chain and insured that the chain is guided along the desired path.

A heating means, such as a plurality of electrical heaters 40, is positioned under tank 20 and is secured to the oven frame. The heaters are thermostatically controlled by conventional means (not shown) and are coupled to a power source through conventional wiring (not shown). Gas burners may of course be substituted for the electrical heaters if desired. heaters are thermostatically controlled by conventional means (not shown) and are coupled to a power source through conventional wiring (not shown). Gas burners may of course be substituted for the electrical heaters if desired.

Products such as chicken parts 44 to be precooked in the oven are conveyed through the tank of cooking oil in a plurality of trays 45 which are preferably about 10 inches wide, 21 inches long, and 1¼ inches high. The trays are formed from light-gage metal such as aluminum, and include perforations or holes 46 through their bottom walls. The trays are placed in the tank between bars 35, and are pulled by the bars through the tank by operation of the conveyor system. Conventional endless-belt conveyors may be used to insert and withdraw trays from the conveyor oven, and an entrance conveyor 48 and an exit conveyor 49 are shown in schematic form in FIG. 1.

I have found that the conveyor oven operates most satisfactorily with products such as coated chicken when the vertical spacing between the floor of tank 20 and the top of dome covers 22 is about 3 to 3½ inches. This spacing has been found to be proper for maintaining the correct degree and amount of hot, humid atmosphere around the product to be cooked. A shorter spacing results in excessively intense heating of the chicken and a consequent loss of natural juices, and larger spacing causes an excessively long cooking cycle and otherwise detracts from the quality of the precooked product. The scalloped surface presented by the serially arranged dome covers 22 retards the flow of hot, humid air toward the ends of the oven such that loss of this atmosphere is minimized.

Tank 20 is preferably about 22 inches wide, and is preferably formed from a material such as cast aluminum of about one-eighth inch thickness, but other materials such as cast iron are also suitable though more difficult to clean. The oven has an overall length of about 24 feet and tank 20 has a horizontal surface about 20 feet in length to permit a relatively long cooking cycle of about 30 minutes for conveyance of the products through the oven.

Operation of the oven will be described in terms of its use with chicken as the oven has been found to be particularly suitable for precooking this type of product. Chicken parts are cleaned and prepared in the usual manner, and while still moist from rinsing, the parts are lightly seasoned. The still-moist parts are then shaken gently in a flour bath to be covered with a light flour coating over their entire outer surfaces. The coated chicken parts are then placed on perforated trays 45 with their boney sides down. This orientation is preferred as it places a minimum amount of skin in contact with the tray.

The trays are then loaded at the entrance end of the oven and are prewarmed as they are conveyed down the inclined entrance to the cooking tank. When the trays reach the level portion of tank 20, they come in contact with the shallow bath of cooking oil which has been heated to about 265° F. to 270° F. The hot cooking oil flows through holes 46 in the floor or bottom wall of each tray, but the oil contacts only the very lowermost part of the chicken as the depth of the cooking-oil bath is limited as described above. That is, the oil extends only to about the level of the upper surface of the tray bottom, and only a very small portion of the chicken is in direct contact with the cooking oil.

The oil is heated to a temperature sufficient to cause vaporization, and the atmosphere substantially enclosed by the tank and domed covers is hot and very humid as it is at least partially saturated with oil vapor. The combination of conductive heat received from the tray and convective heating from this hot atmosphere serves to thoroughly tenderize the chicken and to form a protective shield out of the original dry-flour coating. The coating serves to retard the loss of natural juices during the cooking period. The factors of slow heating, humid atmosphere, and the coating combine to prevent the chicken from becoming dry, and parching of the coating (as typically occurs with dry heat) is also prevented. It has been found that the coating does not become watery or soggy as is often experienced when steam cooking techniques are used with coated products.

At the end of the cooking cycle, the trays are conveyed up the exit end of the conveyor oven. As they move slowly up the inclined ramp at the exit end, oil drains from the bottom of the trays and is returned to the bank. The chicken has been kept relatively free from absorption of cooking oil or fat during the cooking cycle, and is ready for cooling for about 30 minutes in preparation for freezing, packaging, or other processing prior to storage.

When the product is ready to be consumed, it is reheated and cooked by frying. Chicken is quickly cooked either in a conventional frying pan in about 6 minutes per side at medium heat, or for about 6 to 7 minutes in a conventional deep-fat fryer operating at about 360° F. The final product has a taste closely resembling freshly cooked chicken and lacking the offensive oil flavor which is retained in heavily breaded chicken as precooked in a deep-frying process.

It is most important to use perforated trays in this process, and particularly essential to limit the depth of the cooking oil to little more than a thin film which extends just through the floor of the tray to contact only the lowermost parts of the chicken. I have found that the depth of the oil bath should not exceed about one-fourth of an inch, as depths in excess of this value tend to cause excessive dissipation and breakdown of the coating, as well as undesired oil absorption and carryover. The bath, however, should have a depth sufficient to penetrate through the floor of the trays. Experiments with unperforated trays without a thin bath of oil or cooking fat therein have generally been unsatisfactory as the cooked chicken is overly dry and lacks the tender texture which characterizes chicken cooked in perforated trays.

An alternative technique for conveying chicken or similar coated products through the cooker is shown in FIGS. 6 and 7. Chicken parts 55 are positioned in a thin perforated tray 56 which may be identical to tray 45 or may simply be a perforated flat sheet of metal or foil (not shown). An important function of the tray is to facilitate handling of the product without damage to the thin coating (especially immediately after emergence from the oven while the coating is still hot and relatively fragile), and to permit quick draining and cooling. In cases where the precooked product is packaged with the tray for delivery to the ultimate consumer, the tray also serves as a useful carrier for use in final deep-frying of the product.

Tray 56 is placed in an open-top solid pan 57 which carries a thin film or bath of cooking oil 58, the depth of which does not exceed about one-sixteenth to one-eighth inch. Pan 57 has sides 59 which are preferably about 1 inch in height. The pan is in turn conveyed through tank 20 which, as described above, contains a shallow bath of cooking oil which has a depth no greater than about one-fourth inch and is heated to about 265° F. to 270° F. When the pan emerges from the cooker, tray 56 is removed and, if desired, can be packaged with the precooked product.

During precooking, some juices escape from the chicken parts, and these juices pass through the perforations in the tray to be trapped in pan 57. The mixture of juices and the thin layer of fresh oil in the pan can be recovered to provide an excellent base from which gravy for the product is subsequently prepared. Contamination of the main oil bath in tank 20 is also prevented as juices from the product are prevented from dripping into the tank by pan 57. The useful life of the oil is thereby considerably extended, and the oil is maintained in a clean, wholesome condition.

In both of the techniques described above, successful operation is predicted on the use of a perforated tray (which may be a flat sheet, or a sheet with upturned sides) to carry the product, and a shallow bath of cooking oil which directly contacts only the very lowermost part of the product. Control of the bath depth is also important to avoid any flotation of the pan or tray. Flotation is undesirable as it appears to affect a desirable conduction of heat directly from the tank bottom into the tray or pan. In any event, total immersion of the product in the heated oil is always avoided, and the undesirable carryover or retention of cooking oil in the product is minimized.

There has been described a novel cooking apparatus which is suitable for precooking products having only a thin coating to retain natural juices and flavor. The apparatus has been found to be most useful with chicken, and has been described in terms of that application. The apparatus, however, is not limited to this use, and is satisfactory with other types of food products.

What is claimed is:

1. A conveyor cooker for precooking a food product such as chicken, comprising:
 a frame;
 a tank secured to the frame and adapted to contain a shallow bath of cooking oil, the tank including means for limiting the depth of the cooking-oil bath to less than about one-fourth inch;
 a food-product tray disposed in and resting on the tank, the tray having a perforated bottom whereby oil in the tank reaches an upper surface of the tray bottom to contact only lowermost portions of a food product in the tray, and portions of the product above the lowermost portions are isolated from direct immersion in the oil by the tank depth-limiting means;
 conveying means for moving the tray through the tank; and
 heating means for maintaining the cooking oil at an elevated temperature.

2. The cooker defined in claim 1, and further comprising a plurality of domed covers adapted to be positioned along and over the cooking-oil tank whereby the tank is substantially covered except at its entrance and exit ends.

3. The cooker defined in claim 2 in which the domed covers and tank are spaced to define an enclosure having a height of about 3 to 3½ inches.

4. A conveyor cooker for precooking a food product such as chicken, comprising
 a frame;
 an elongated tank secured to the frame and adapted to contain a shallow bath of cooking oil, the tank including means for limiting the depth of the bath to less than about one-fourth inch;
 a solid, open-top pan disposed in and resting on the tank, the pan being adapted to hold a thin layer of cooking oil;
 a food-product tray disposed in and resting on the pan, the tray having a perforated bottom whereby oil in the pan reaches an upper surface of the tray bottom to contact lowermost portions of a food product in the tray;
 conveying means for moving the pan through the tank; and
 heating means for maintaining the cooking oil at an elevated temperature.

5. The cooker defined in claim 4, and further comprising a plurality of domed covers adapted to be positioned along and over the cooking-oil tank whereby the tank is substantially covered except at its entrance and exist ends.

PO-1050
(5/69)

UNITED STATES PATENT OFFICE
CERTIFICATE OF CORRECTION

Patent No. 3,604,340      Dated September 14, 1971

Inventor(s) Stanley J. Simmons

It is certified that error appears in the above-identified patent and that said Letters Patent are hereby corrected as shown below:

Column 1, line 41, "substantially" should read --subsequently--.

Column 3, line 15 "insured" should read --insure--;
lines 23 through 26 delete "heaters are thermostatically controlled by conventional means (not shown) and are coupled to a power source through conventional wiring (not shown). Gas burners may of course be substituted for the electrical heaters if desired."

Column 4, line 35, after "and" insert --finish--.

Column 5, line 16 "predicted" should read --predicated--.

Signed and sealed this 18th day of April 1972.

(SEAL)
Attest:

EDWARD M. FLETCHER, JR.
Attesting Officer

ROBERT GOTTSCHALK
Commissioner of Patents